(12) United States Patent
Gandy et al.

(10) Patent No.: US 8,011,542 B2
(45) Date of Patent: Sep. 6, 2011

(54) MOTORCYCLE SISSY BAR LUGGAGE MOUNTING SYSTEM

(75) Inventors: Mark Gandy, Calabasas Hills, CA (US); Michael MacGregor, Calabasas Hills, CA (US)

(73) Assignee: Helmet House, Inc., Calabasas Hills, CA (US)

( * ) Notice: Subject to any disclaimer, the term of this patent is extended or adjusted under 35 U.S.C. 154(b) by 930 days.

(21) Appl. No.: 11/959,237

(22) Filed: Dec. 18, 2007

(65) Prior Publication Data

US 2009/0152313 A1 Jun. 18, 2009

(51) Int. Cl.
 *B62J 7/00* (2006.01)
 *B62J 7/04* (2006.01)
(52) U.S. Cl. .......................... 224/413; 224/275; 224/427
(58) Field of Classification Search .................. 224/275, 224/427, 581–583, 585, 675; 24/3.7, 578.13
See application file for complete search history.

(56) References Cited

U.S. PATENT DOCUMENTS

| | | | |
|---|---|---|---|
| 4,003,508 A | 1/1977 | Hoops | |
| 4,066,196 A | 1/1978 | Jackson | |
| D249,036 S | 8/1978 | Ramalia | |
| 4,125,213 A | 11/1978 | Watkins | |
| 4,605,143 A | 8/1986 | Parker | |
| 4,638,933 A | 1/1987 | Boufford | |
| 5,405,068 A | 4/1995 | Lovett | |
| D360,182 S | 7/1995 | Lovett | |
| 5,632,071 A * | 5/1997 | Maunder | 24/580.1 |
| 5,941,195 A | 8/1999 | Martz | |
| 6,123,239 A * | 9/2000 | Lovitt | 224/413 |
| 6,533,152 B1 | 3/2003 | Dischler | |
| 6,547,114 B2 * | 4/2003 | Smith | 224/413 |
| 6,802,440 B1 * | 10/2004 | Stowell | 224/413 |
| 2003/0201292 A1 | 10/2003 | Lovett | |
| 2004/0011840 A1 | 1/2004 | Lovett | |
| 2005/0161482 A1 | 7/2005 | Krohn | |
| 2005/0161483 A1 * | 7/2005 | Krohn et al. | 224/413 |
| 2007/0057002 A1 * | 3/2007 | Timm et al. | 224/625 |

OTHER PUBLICATIONS

International Preliminary Report on Patentability for related PCT/US2008/087044 application.

* cited by examiner

*Primary Examiner* — Justin Larson
*Assistant Examiner* — Adam Waggenspack
(74) *Attorney, Agent, or Firm* — Jeffer Mangels Butler & Mitchell LLP

(57) ABSTRACT

A piece of luggage that includes a main body portion having a front and a back and a system for mounting the piece of luggage on an object. The system includes at least first and second receivers attached to the front of the main body portion, a horizontally oriented band and first and second rods. The horizontally oriented band includes a plurality of vertically oriented passages defined therethrough. The first receiver and one of the passages cooperate to define a first path and the second receiver and one of the passages cooperate to define a second path. The first and second rods are each respectively removably received in the first and second paths. In a preferred embodiment, the band includes a middle section having a vertically oriented slot defined therein and two adjustment sections extending outwardly from the middle section. A plurality of vertically oriented passages are defined through each of the adjustment sections and the mounting system also includes a vertically oriented strap extending from the front of the main body portion that is adapted to be received in the vertically oriented slot.

12 Claims, 6 Drawing Sheets

MOTORCYCLE SISSY BAR LUGGAGE MOUNTING SYSTEM

FIELD OF THE INVENTION

The present invention relates to a system for mounting a bag to a motorcycle sissy bar or backrest, and more particularly an adjustable system for mounting a bag to a motorcycle sissy bar or backrest.

BACKGROUND OF THE INVENTION

Motorcycles include limited space for riders and passengers to carry belongings. Many motorcycles include a back support behind the rider and passenger for supporting the passengers back. This back support is often referred to as a "sissy bar." Often, motorcycle riders attach duffle bags, backpacks and the like to the sissy bar using rope, bungee cords or the like.

A need exists for an adjustable system for attaching a bag or the like to the sissy bar.

SUMMARY OF THE PREFERRED EMBODIMENTS

In accordance with a preferred embodiment of the present invention, there is provided a piece of luggage that includes a main body portion having a front and a back and a system for mounting the piece of luggage on an object. The system includes at least first and second receivers attached to the front of the main body portion, a horizontally oriented band and first and second rods. The horizontally oriented band includes a plurality of vertically oriented passages defined therethrough. The first receiver and one of the passages cooperate to define a first path and the second receiver and one of the passages cooperate to define a second path. The first and second rods are each respectively removably received in the first and second paths. In a preferred embodiment, the band includes a middle section having a vertically oriented slot defined therein and two adjustment sections extending outwardly from the middle section. A plurality of vertically oriented passages are defined through each of the adjustment sections and the mounting system also includes a vertically oriented strap extending from the front of the main body portion that is adapted to be received in the vertically oriented slot.

In accordance with another preferred embodiment of the present invention, there is provided a piece of luggage that includes a main body portion having a front and a back and a system for mounting the piece of luggage on an object. The system includes at least first and second upper receivers and at least first and second corresponding lower receivers attached to the front of the main body portion, a first fastener portion extending from the front of the main body portion, a vertically oriented strap extending from the front of the main body portion, a horizontally oriented band, first and second rods, and a section of hook and loop fasteners disposed on the front of the main body portion that correspond to sections of hook and loop fasteners on the band. The strap has a second fastener portion extending therefrom that corresponds to the first fastener portion extending from the main body portion. The horizontally oriented band includes a middle section having a vertically oriented slot defined therein and two adjustment sections extending outwardly from the middle section. Each of the adjustment sections include a plurality of vertically oriented passages defined therethrough. The first upper receiver, one of the passages and the first lower receiver cooperate to define a first path and the second upper receiver, one of the passages and the second lower receiver cooperate to define a second path. The first and second rods are each respectively removably received in the first and second paths.

In accordance with yet another preferred embodiment of the present invention, there is provided a method of mounting a piece of luggage to an object. The method includes the steps of providing a piece of luggage comprising a main body portion, wrapping a band around the object, wherein the band includes at least two vertically oriented passages therein, aligning a first vertically oriented passage with a first receiver on the main body portion, inserting a first rod through the first receiver and the first vertically oriented passage, aligning a second vertically oriented passage with a second receiver on the main body portion, and inserting a second rod through the second receiver and the second vertically oriented passage, thereby securing the band around the object. In a preferred embodiment, the method includes the steps of removing the first rod from the first vertically oriented passage and first receiver, aligning a third vertically oriented passage with the first receiver and inserting the first rod through the first receiver and the third vertically oriented passage, thereby adjusting the security of the band on the object.

In accordance with yet another preferred embodiment of the present invention, there is provided a method of mounting a piece of luggage to an object. The method includes the steps of providing a piece of luggage comprising a main body portion, wrapping a band secured to the main body portion around the object, wherein the band includes a vertically oriented slot defined therein and the main body portion includes a strap extending therefrom, inserting the strap through the slot, and fastening together a first fastener portion extending from the main body portion and a second fastener portion extending from the strap.

BRIEF DESCRIPTION OF THE DRAWINGS

Like numerals refer to like parts throughout the several views of the drawings.

DESCRIPTION OF THE PREFERRED EMBODIMENTS

Figure 1:
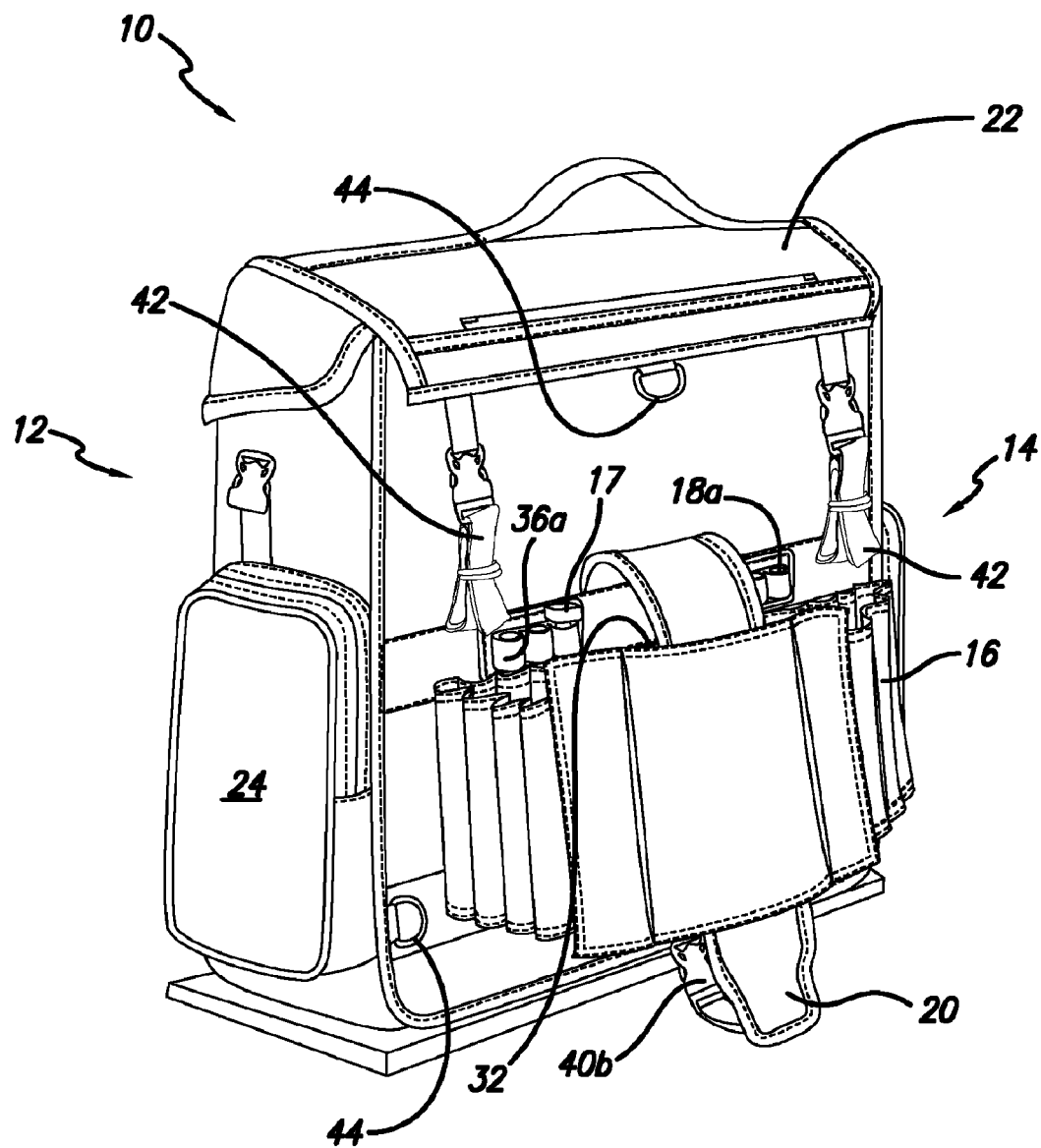
FIG. 1 is a perspective view of a bag including an adjustable mounting system in accordance with a preferred embodiment of the present invention.

As shown in the drawings, for purposes of illustration, the invention is embodied in a system for mounting a bag or the like to an object. In a preferred embodiment, and in the exemplary description below, the system is used to mount a bag to the sissy bar or backrest of a motorcycle. However, this is not a limitation on the present invention. It will be appreciated that the system can be used to mount bags or the like to other objects.

It will be appreciated that terms such as "front," "back," "top," "bottom," "left," "right," "above," and "side" used herein are merely for ease of description and refer to the orientation of the components as shown in the figures. It should be understood that any orientation of the mounting system and bag, and the components thereof described herein, is within the scope of the present invention.

As shown in FIGS. 1-6, generally, the bag 10 includes a main body portion 12 and a mounting system 14. The mounting system 14 generally includes a band 16, a plurality of rods 17 and receiver assemblies 18 and a securing strap 20.

It will be understood that the main body portion 12 of the bag 10 can be any bag or piece of luggage and that the shape, material, number of pockets, zippers, snaps, etc. is not a limitation on the present invention. In the exemplary embodiment shown in the figures, the majority of the bag 10 is constructed from a durable, water resistant fabric preferably a heavyweight nylon with considerable dimensional stability. In other embodiments, the bag may be comprised of leather/synthetic leather or other suitable or similar materials. The bag 10 may be equipped with external rain covers or internal rainliners to further ensure that the contents thereof remain dry during adverse conditions. Preferably, the bag 10 includes a hinged top 22 and a plurality of pockets 24. The bag 10 may include any number of pockets in order to increase storage capacity. Access to the pockets can be provided by zippers, snaps, buttons or the like.

Figure 2:
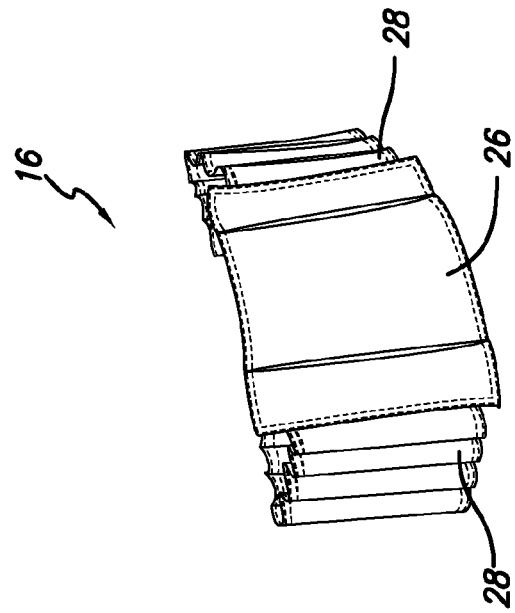
FIG. 2 is an exploded perspective view of the bag of FIG. 1.
Figure 2:
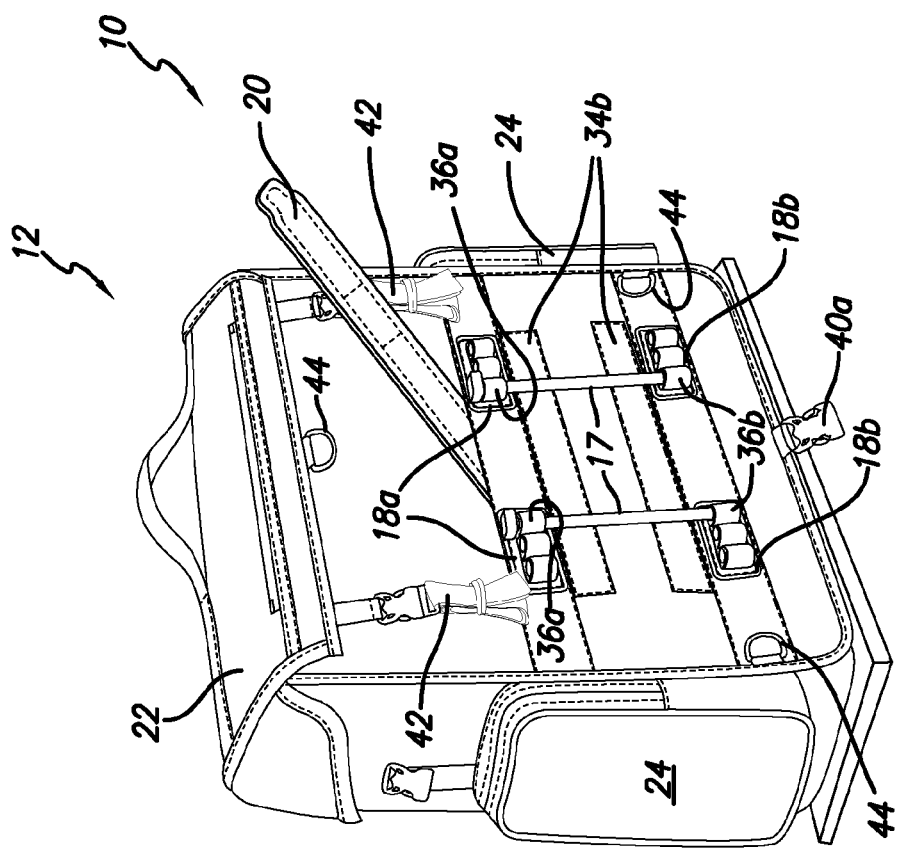
Figure 3A:
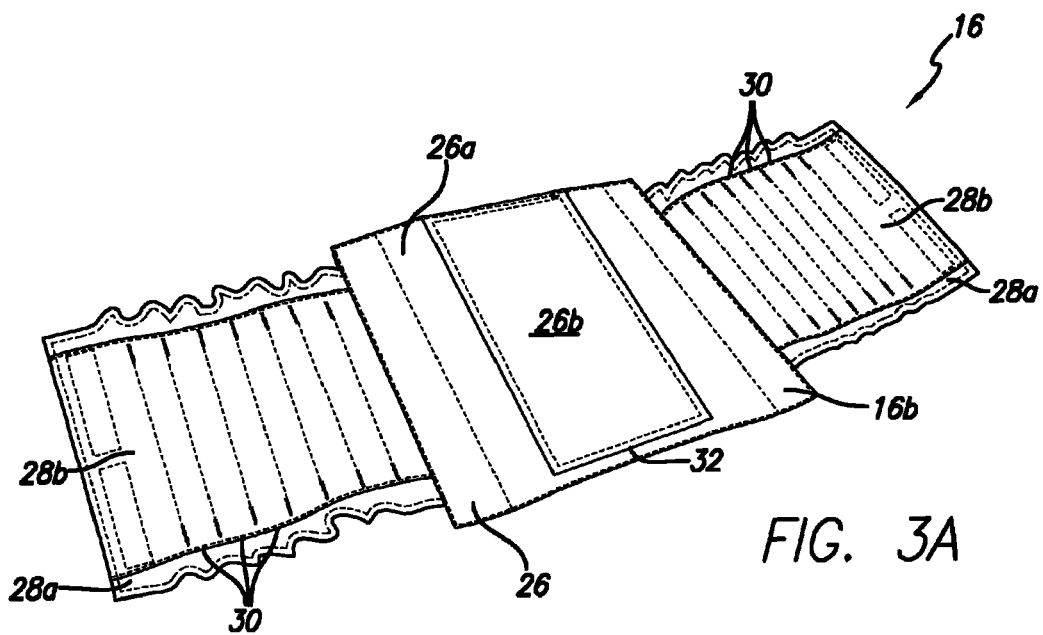
FIG. 3a is a perspective view of the back of the band of the bag of FIG. 1.
Figure 3B:
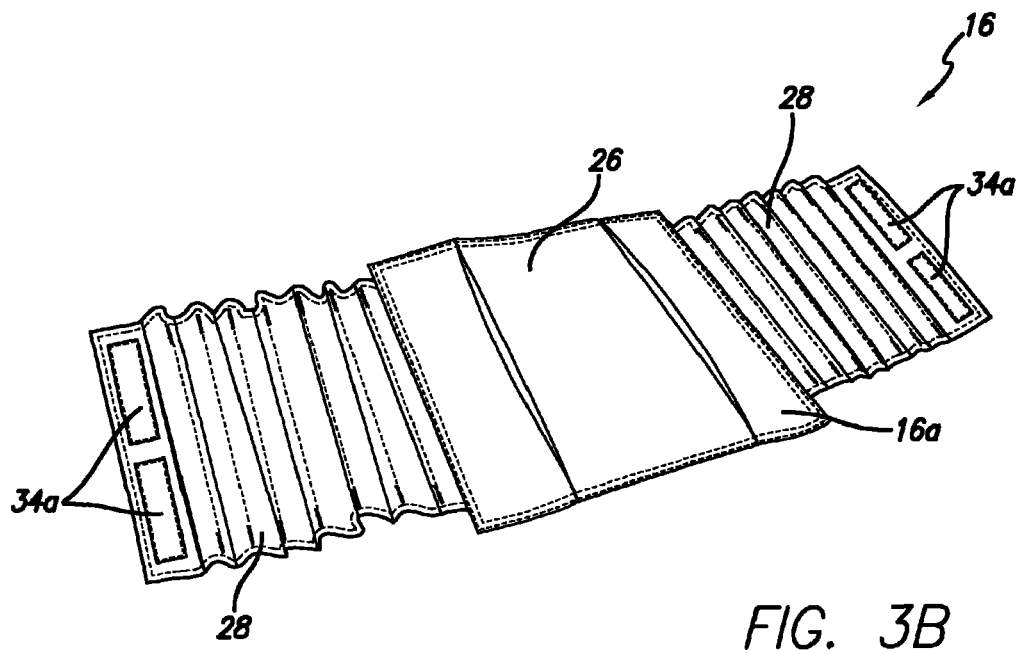
FIG. 3b is a perspective view of the front of the band of the bag of FIG. 1.

As is best shown in FIGS. 1-3b, the band 16 includes a backrest section 26 with two adjustment sections 28 extending outwardly therefrom. The adjustment sections 28 each have a plurality of vertically extending passages 30 defined therein. As shown in FIG. 3a, in a preferred embodiment, the adjustment section each comprise first and second sheets of material 28a and 28b. To form the passages 30, the first sheet of material 28a is "accordianed" (as is best shown in FIG. 3b) and the second sheet of material 28b is overlayed thereon and attached thereto (by sewing or the like) However, it will be appreciated that this is not a limitation on the present invention and that the vertically oriented passages 30 can be formed by other methods and/or materials.

As shown in FIG. 3a, the backrest section includes a vertically oriented slot 32 defined therethrough. As will be described below, slot 32 receives securing strap 20 when securing the bag 10 to a backrest 100. In a preferred embodiment, slot 32 is formed by first and second layers 26a and 26b of the backrest section 26. To form slot 32, second layer 26b is sewn at its outer edges, but not at its top and bottom edges, to first layer 26a. Other methods for forming slot 32 are contemplated and will be readily apparent to those skilled in the art.

As shown in FIG. 3b, in a preferred embodiment, band 16 includes fasteners 34a adjacent the ends thereof that cooperate with fasteners 34b on the main body portion 12 (see FIG. 2). For ease of adjustment, preferably the fasteners 34 are hook and loop fasteners. However, the fasteners may be snaps, buttons, zippers or other fasteners known in the art.

With reference to FIG. 2, the front 12a of main body portion 12 includes portions of the mounting system 14, including securing strap 20, the receiver assemblies 18 and fasteners 34b. As is shown in FIG. 2, the receiver assemblies 18 include upper receiver assemblies 18a and lower receiver assemblies 18b, which each include a plurality of receivers 36. For ease of description the upper and lower receiver assemblies 18 and individual receivers 36 may be referred to herein generically without the "a" and "b" suffixes or an "a" suffix may be used to denote the upper receiver assemblies or receivers and the "b" suffix may be used to denote the lower receiver assemblies or receivers. For example, the upper and lower receiver assemblies may be referred to individually as 18a and/or 18b or they may be referred to generically as receiver assembly 18.

Figure 4A:
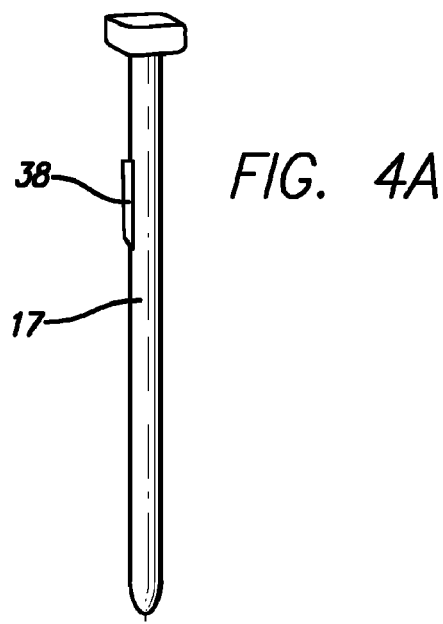
FIG. 4a is an exploded perspective view of the pin and upper and lower receivers.
Figure 4B:
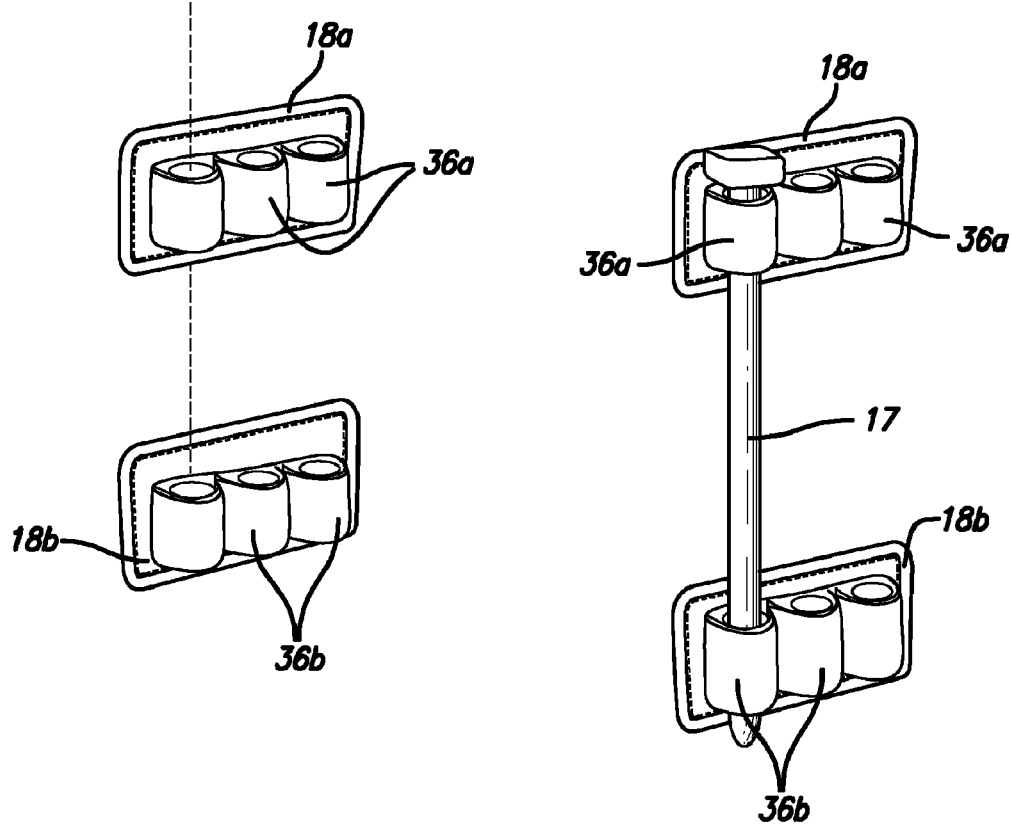
FIG. 4b is a perspective view of the pin inserted into the upper and lower receivers.

As shown in FIGS. 2 and 4a-4b, the upper and lower receivers 36 are aligned to receive rod 17. In a preferred embodiment, rod 17 includes a spring biased pin 38 (see FIG. 4a) that prevents rod 17 from backing out of the receivers 36 once it has been received therein (see FIG. 4b) Pin 38 is preferably sloped so that when rod 17 is inserted into upper receiver 36a it will be depressed. Pin 38 is preferably positioned along the length of rod 17 so that after pin 38 has traveled through upper receiver 36a it will be biased outwardly. Preferably it has a top that is generally parallel to the bottom surface of receiver 36a so that it will abut thereagainst when someone or something tries to pull rod 17 out of the receivers 36 without depressing pin 38. As shown in FIG. 2, in an embodiment of the invention, the lower receivers 36 can have closed bottoms so that the rod 17 cannot fall therethrough.

The use of mounting system 14 to mount bag 10 to a motorcycle backrest 100 will now be described. Bag 10 is placed adjacent the backrest 100 and band 16 is wrapped around backrest 100 and fasteners 34a are secured to fasteners 34b to provide the desired fit around backrest 100. In doing this, bag 10 may be placed on a luggage rack, however, some motorcycles do not include luggage racks and bag 10 may not rest on anything. A rod 17 on each side is then inserted through an upper receiver 36a, a vertically oriented passage 30 and a lower receiver 36 as desired. The upper and lower receiver assemblies 18 are preferably spaced apart so that band 16 fits therebetween. For best fit a user can use the same receivers 36 and passages 30 on both sides, however this is not a limitation on the present invention.

Figure 6:
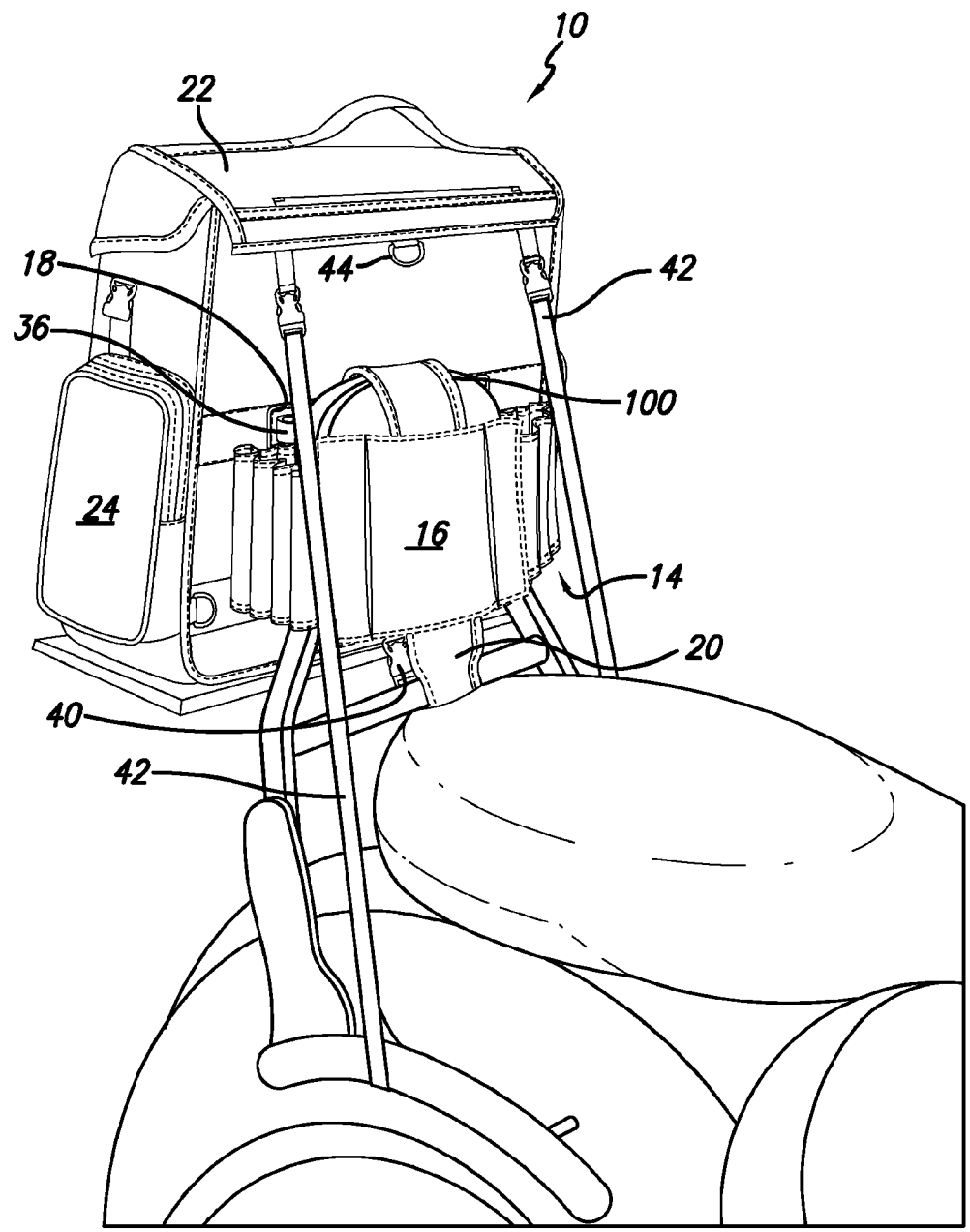
FIG. 6 is a perspective view of the bag of FIG. 1 mounted on the sissy bar of a motorcycle.

Securing strap 20 is then inserted through slot 32 and pulled out the bottom thereof. As can be seen in FIG. 1, main body portion includes a fastener or quick disconnect, such as a buckle 40a. This buckle portion 40a cooperates with a corresponding fastener or buckle portion 40b on the end of securing strap 20, as shown in FIG. 2. As is shown in FIG. 6, buckle portion 40b (which may include a length of strap) is received under backrest 100 and is removably fastened to buckle portion 40a. As will be appreciated by those skilled in the art (and as evident in FIG. 6), band 16 provides horizontal mounting to backrest 100 and securing strap 20 provides vertical mounting to backrest 100.

In another embodiment, band 16 can be secured onto main body portion 12 using fasteners 34 and rods 17 before the bag 10 is placed on backrest 100. In this embodiment, band 16 is slid over backrest 100 after it has been secured to main body portion 12. Then securing strap 20 is secured as described above.

As shown in FIGS. 1 and 6, in a preferred embodiment, bag 10 also includes straps 42 for further stability in mounting bag 10. The straps 42 are shown folded and secured by rubberbands in FIGS. 1 and 2. In use, as shown in FIG. 6, these straps 42 can be secured to any portion of the motorcycle or frame to add extra stability. Any number of straps 42 are within the scope of the present invention.

Preferably, the backrest portion 26 of band 16 is padded. This provides additional comfort for a passenger. If a passenger is not being carried, bag 10 may be mounted in a reversed orientation so that it sits on the seat. This position of the bag 1 enables the rider to use the band 16 as a backrest. In another embodiment, the band 16 can be permanently affixed to the main body portion 12.

Figure 5:
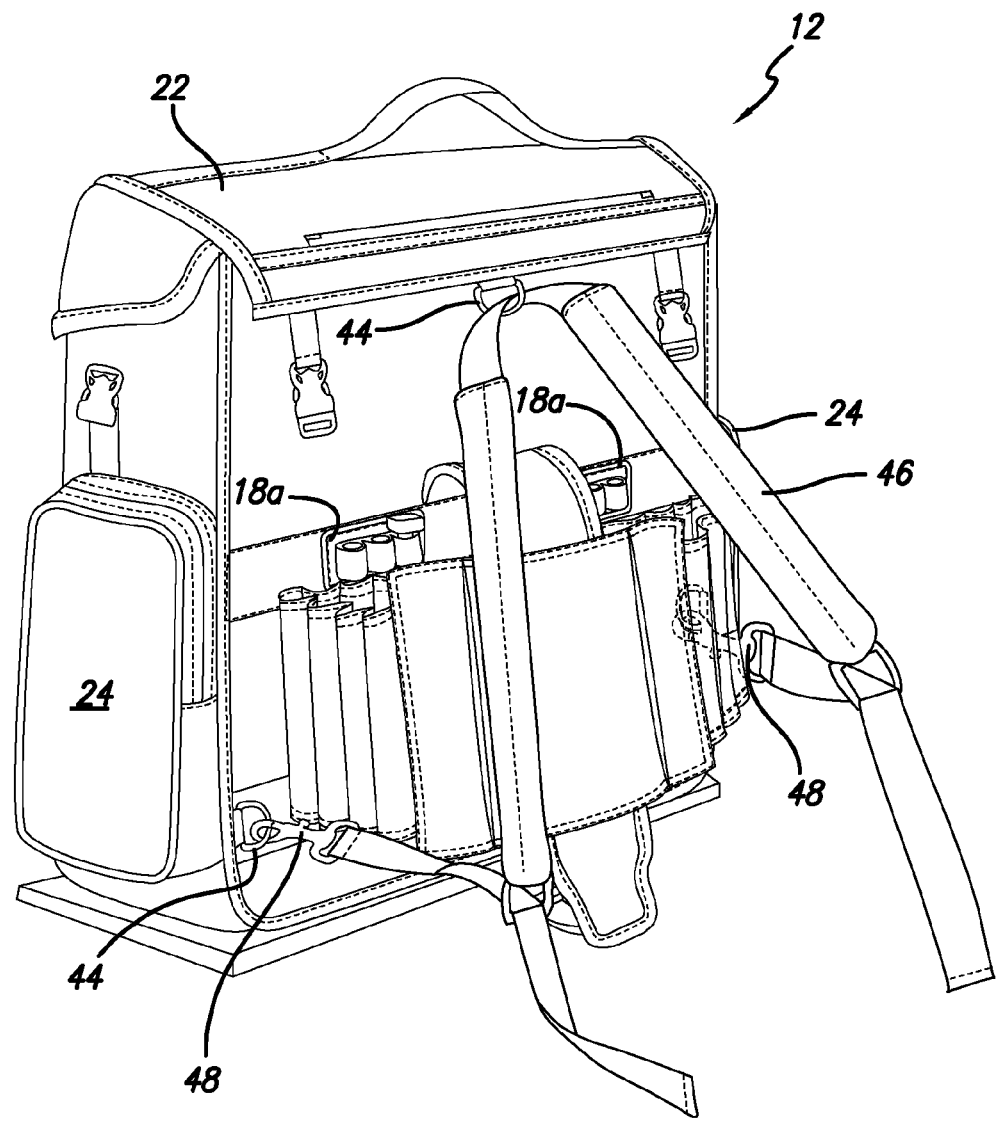
FIG. 5 is a perspective view of the bag of FIG. 1 with the back pack strap attached thereto.

In a preferred embodiment of the present invention, bag 10 includes a plurality of loops 44 for receiving a back pack strap 46 or straps. The loops 44 without the backpack strap 46 are best shown in FIG. 2. As shown in FIG. 5, a single backpack strap 46 can be secured to main body portion 12 by feeding strap 46 through the upper loop 44 and securing fasteners 48 on the ends of strap 46 to the other loops 44. When not used with backpack strap 46 loops 40 may facilitate attaching additional articles to bag 10 to further increase its carrying capacity.

The foregoing embodiments are merely examples of the present invention. Those skilled in the art may make numerous uses of, and departures from, such embodiments without departing from the spirit and the scope of the present invention. Accordingly, the scope of the present invention is not to be limited to or defined by such embodiments in any way, but rather, is defined solely by the following claims.

What is claimed is:

1. An article of manufacture comprising:
   a. a piece of luggage comprising a main body portion having a front and a back,
   b. a system for mounting the piece of luggage on an object, the system comprising
      i. at least first and second receivers attached to the front of the main body portion,
      ii. a horizontally oriented band, wherein the horizontally oriented band includes a plurality of vertically oriented passages defined therethrough, wherein the vertically oriented passages are arranged adjacent to one another in a horizontal direction, wherein the first receiver and one of the passages cooperate to define a first path, and wherein the second receiver and one of the passages cooperate to define a second path, wherein the band includes a middle section having a vertically oriented slot with an open top and an open bottom defined therein and two adjustment sections extending outwardly from the middle section, wherein the plurality of vertically oriented passages are defined through each of the adjustment sections, wherein the mounting system further comprises a vertically oriented strap extending from the front of the main body portion that is adapted to be received through the open top and out the open bottom of the vertically oriented slot, and
      iii. first and second rods that are each respectively removably received in the first and second paths.

2. The article of manufacture of claim 1 wherein the mounting system further includes third and fourth receivers attached to the main body portion, wherein the first receiver, third receiver and one of the passages cooperate to define the first path, and wherein the second receiver, fourth receiver and one of the passages cooperate to define the second path.

3. The article of manufacture of claim 2 wherein the mounting system further comprises a first fastener portion extending from the front of the main body portion, and the vertically oriented strap includes a corresponding second fastener portion extending therefrom.

4. The article of manufacture of claim 1 wherein the band has opposite ends which each include a hook and loop fastener section, and wherein the front of the main body portion includes at least one corresponding hoop and loop faster section.

5. The article of manufacture of claim 2 wherein the middle section of the band includes padding therein.

6. The article of manufacture of claim 2 wherein the adjustment sections each comprise first and second pieces of layered material that are attached together at locations that are spaced apart from one another, thereby defining the plurality of vertically oriented passages therein.

7. The article of manufacture of claim 1 wherein the main body portion includes a plurality of loops attached thereto, and wherein a back pack strap is removably attached to the loops.

8. An article of manufacture comprising:
   a. a piece of luggage comprising a main body portion having a front and a back, and
   b. a system for mounting the piece of luggage on an object, the system comprising
      i. at least first and second upper receivers and at least first and second corresponding lower receivers attached to the front of the main body portion,
      ii. a first fastener portion extending from the front of the main body portion,
      iii. a vertically oriented strap extending from the front of the main body portion, wherein the strap has a second fastener portion extending therefrom,
      iv. a horizontally oriented band, wherein the horizontally oriented band includes a middle section having a vertically oriented slot with an open top and an open bottom defined therein and two adjustment sections extending outwardly from the middle section, wherein each of the adjustment sections include a plurality of vertically oriented passages defined therethrough and a section of hook and loop fasteners, wherein the vertically oriented passages of each adjustment section are arranged adjacent to one another in a horizontal direction, wherein the first upper receiver, one of the passages and the first lower receiver cooperate to define a first path, and wherein the second upper receiver, one of the passages and the second lower receiver cooperate to define a second path,
      v. first and second rods that are each respectively removably received in the first and second paths, and
      vi. a section of hook and loop fasteners disposed on the front of the main body portion that correspond to the section of hook and loop fasteners on the band.

9. A method of mounting a piece of luggage to an object, the method comprising the steps of:
   providing a piece of luggage comprising a main body portion, wherein the main body portion includes a strap extending therefrom
   wrapping a band at least partially around the object, wherein the band includes at least two vertically oriented passages therein, and wherein the band includes a vertically oriented slot having an open top and an open bottom defined therein,
   aligning a first vertically oriented passage with a first receiver on the main body portion,
   inserting a first rod through the first receiver and the first vertically oriented passage,
   aligning a second vertically oriented passage with a second receiver on the main body portion,
   inserting a second rod through the second receiver and the second vertically oriented passage, thereby securing the band at least partially around the object, and,
   positioning a portion of the strap over the top of the object and inserting the strap through the open top and out the open bottom of the vertically oriented slot.

10. The method of claim 9 wherein the band includes a vertically oriented slot defined therein and the main body portion includes a strap extending therefrom, and the method further comprises the step of inserting the strap through the slot.

11. The method of claim 10 wherein the main body portion includes a first fastener portion and the strap includes a second fastener portion, and the method further comprises the step of securing the first fastener portion to the second fastener portion.

12. The method of claim 9 further comprising the steps of removing the first rod from the first vertically oriented passage and first receiver, aligning a third vertically oriented passage that is not in alignment with the first vertically oriented passage with the first receiver and inserting the first rod through the first receiver and the third vertically oriented passage, wherein the first vertically oriented passage does not include a rod therein.

* * * * *